US008573493B2

(12) United States Patent
Dean et al.

(10) Patent No.: US 8,573,493 B2
(45) Date of Patent: Nov. 5, 2013

(54) METHOD AND SYSTEM FOR SMART CARD VIRTUALIZATION

(75) Inventors: Gamma O. Dean, Ft. Lauderdale, FL (US); Anthony K. Scragg, Jr., Coconut Creek, FL (US); Craig S. Siegman, Pembroke Pines, FL (US)

(73) Assignee: Avocent Corporation, Huntsville, AL (US)

( * ) Notice: Subject to any disclaimer, the term of this patent is extended or adjusted under 35 U.S.C. 154(b) by 727 days.

(21) Appl. No.: 12/458,086

(22) Filed: Jun. 30, 2009

(65) Prior Publication Data

US 2010/0327059 A1    Dec. 30, 2010

(51) Int. Cl.
*G06K 7/00*  (2006.01)
(52) U.S. Cl.
USPC ............................. 235/435; 235/375
(58) Field of Classification Search
USPC ............................. 235/435, 375, 380, 379, 383
See application file for complete search history.

(56) References Cited

U.S. PATENT DOCUMENTS

| 6,481,621 | B1 | 11/2002 | Herrendoerfer et al. | |
|---|---|---|---|---|
| 7,478,180 | B1 | 1/2009 | Li | |
| 2005/0044236 | A1 | 2/2005 | Stafford | |
| 2005/0108375 | A1* | 5/2005 | Hallak-Stamler | 709/223 |
| 2006/0123129 | A1* | 6/2006 | Toebes et al. | 709/230 |
| 2007/0011374 | A1 | 1/2007 | Kumar et al. | |
| 2007/0124536 | A1* | 5/2007 | Carper | 711/115 |
| 2007/0174033 | A1 | 7/2007 | Huang et al. | |
| 2007/0204153 | A1* | 8/2007 | Tome et al. | 713/164 |
| 2007/0288681 | A1 | 12/2007 | Lee et al. | |
| 2008/0005446 | A1 | 1/2008 | Frantz et al. | |
| 2008/0028120 | A1 | 1/2008 | McLeod | |
| 2008/0046967 | A1* | 2/2008 | Pan et al. | 726/2 |
| 2008/0071950 | A1 | 3/2008 | Justice | |
| 2008/0168118 | A1 | 7/2008 | Hickey et al. | |
| 2008/0218581 | A1 | 9/2008 | Tsai | |
| 2009/0204965 | A1 | 8/2009 | Tanaka et al. | |
| 2009/0327418 | A1 | 12/2009 | Zhang et al. | |
| 2010/0162235 | A1* | 6/2010 | Ginzton et al. | 718/1 |
| 2010/0186076 | A1* | 7/2010 | Ali et al. | 726/9 |
| 2011/0119666 | A1 | 5/2011 | Flynn | |

OTHER PUBLICATIONS

International Search Report and Written Opinion from PCT Appln. No. PCT/US2010/001684 mailed Aug. 9, 2010.
International Search Report and Written Opinion mailed Apr. 24, 2012 in PCT/US2012/028897.
International Search Report and Written Opinion mailed May 23, 2012 in PCT/US2012/028443.
Preliminary Report on Patentability mailed Jan. 12, 2012 in PCT/US2010/001684.
U.S. Appl. No. 13/069,726—Feb. 1, 2012 PTO Office Action.
U.S. Appl. No. 13/070,175—Feb. 1, 2012 PTO Office Action.

* cited by examiner

*Primary Examiner* — Edwyn Labaze
(74) *Attorney, Agent, or Firm* — Davidson Berquist Jackson & Gowdey, LLP

(57) ABSTRACT

Methods and systems are provided to allow personal computer users to virtualize a local smart card so that they can remotely connect to a server and interact with the server as if the local smart card was physically connected to the server. They connect a remote smart card target hardware device to the target system through a physical connection, such as a USB connection, and the device interacts with the local user's computer and smart card reader over a network. The target system is unaware that the smart card reader is not connected directly to the system through a physical connection, and the target system does not need special software to implement the remote smart card reader. The smart card target device connected to the target computer may be physically connected and disconnected.

17 Claims, 4 Drawing Sheets

METHOD AND SYSTEM FOR SMART CARD VIRTUALIZATION

This generally relates to smart cards and more particularly to virtualization of a smart card reader over a network.

BACKGROUND

The electronic commerce industry has a need to provide authentication of users before providing access to the processing capabilities of a computer or before performing electronic interactions while logged onto the computer. Prior to allowing access to computer resources, the computer needs to determine when a user which is attempting to gain access is an authorized user. Additionally, when transacting business over the Internet, authenticating the identity of a user is important when money and valuable data are transferred. Regardless of the activity, it is desirable to allow only authorized users to perform operations on a secure computer system.

Prior to the availability of electronic tokens, typical systems used simple passwords to authenticate a user and to allow access to a computer. The password method of providing access control has been found to be inadequate when protecting business data having valuable data stored on the computer. Simple passwords may be discovered and improperly used. When passwords are transmitted over a network, they may be intercepted and used for unauthorized purposes. Many businesses use a one-time pass code which changes every few seconds to determine access to computer systems. For even greater security, smart cards which contain certified account numbers which are difficult to counterfeit are used A smart card is a plastic card that holds electronic tokens (e.g., digital signatures, user identification and information, encryption and decryption keys, security tokens, biometrics information) which are read into a computer via a card reader. Smart cards typically contain large coded messages which are difficult to counterfeit.

Additionally, information describing users may be stored as electronic tokens on cards. An electronic token may be used in a procedure for granting access to a user of a computer system via an access control program. A computer system grants access to the user when the user is identified as an authorized user of the system, and denies access to the user when the user fails to be identified as an authorized user of the system.

In another aspect of computing, systems exist to facilitate remote control of and access to a computer by an operator at a remote station. Such systems typically use a device or mechanism that enables an operator at a remote station to control aspects of a so-called target (or local) computer. More particularly, such systems typically allow a remote station to provide mouse and keyboard input to the target computer and further allow the remote station to view the video display output of the target computer. These types of systems are typically called keyboard-video-mouse (KVM) systems.

Remote KVM systems allow a user to interact with a computer anywhere in the world via the keyboard, mouse, and video, as if they were seated right next to the computer. In addition to virtualization of the keyboard, mouse and video, storage media such as CD/DVD-ROMs, flash drives, and floppy disks have also been virtualized. A user can provide access to data on a disk to a server anywhere in the world.

As the need for computer security increases, more and more users use smart cards to authorize and authenticate their access to computer systems and programs. Conventional systems provide special software installed and running on the target computer to interact with a remote smart card reader through a network connection. However, this software running on the target must be specifically tailored, requires greater overhead and infrastructure, and provides less flexibility.

Conventional USB-over-IP systems allow a user to use a USB device in one location while it is virtualized from a PC in another location. These products, however, also require special software be installed on both the local PC and the remote PC. Installing software on the client PC may be acceptable, but installing it on the target PC is typically not as it may violate the security of the computer to be accessed.

The target computer does not typically have a physical USB connection to the smart card reader without the installation of software on the target computer. Accordingly, there is a desire for a system that provides virtualization of smart card use while not requiring special software to do so.

SUMMARY

In accordance with methods and systems consistent with the present invention, a data processing system for virtualization of a smart card reader is provided comprising a target computer configured to send and receive smart card data to a locally connected device, and a client computer locally connected to a smart card reader. It further provides a smart card virtualization device locally connected to the target computer, configured to receive smart card commands from the locally connected target computer, to send the received smart card commands to the client computer over a network, and to receive smart card command response data from the client smart card reader over the network. The smart card virtualization device is further configured to process the received smart card command response data, and to send the processed smart card response data to the locally connected target computer through a physical connection.

In one implementation, a smart card virtualization device is provided comprising a network interface configured to interact with a client computer to send smart card commands and receive smart card command responses over a network, and an input/output interface configured to physically connect to a target computer, and to receive smart card commands from the target computer and send smart card command response. The smart card virtualization device further comprises a processor configured to translate the received smart card commands from the physical input/output interface for output to the network interface, and translate received smart card command response from network interface and for output to the physical input/output interface.

In another implementation, a method in a data processing system for virtualization of a smart card reader is provided comprising receiving smart card commands from a locally connected target computer, and sending the received smart card commands to a client computer connected to a smart card reader over a network. The method further comprises receiving smart card command response data from the client computer over the network, processing the received smart card command response data, and sending the processed smart card response data to the locally connected target computer through a physical connection.

DETAILED DESCRIPTION

Figure 1:
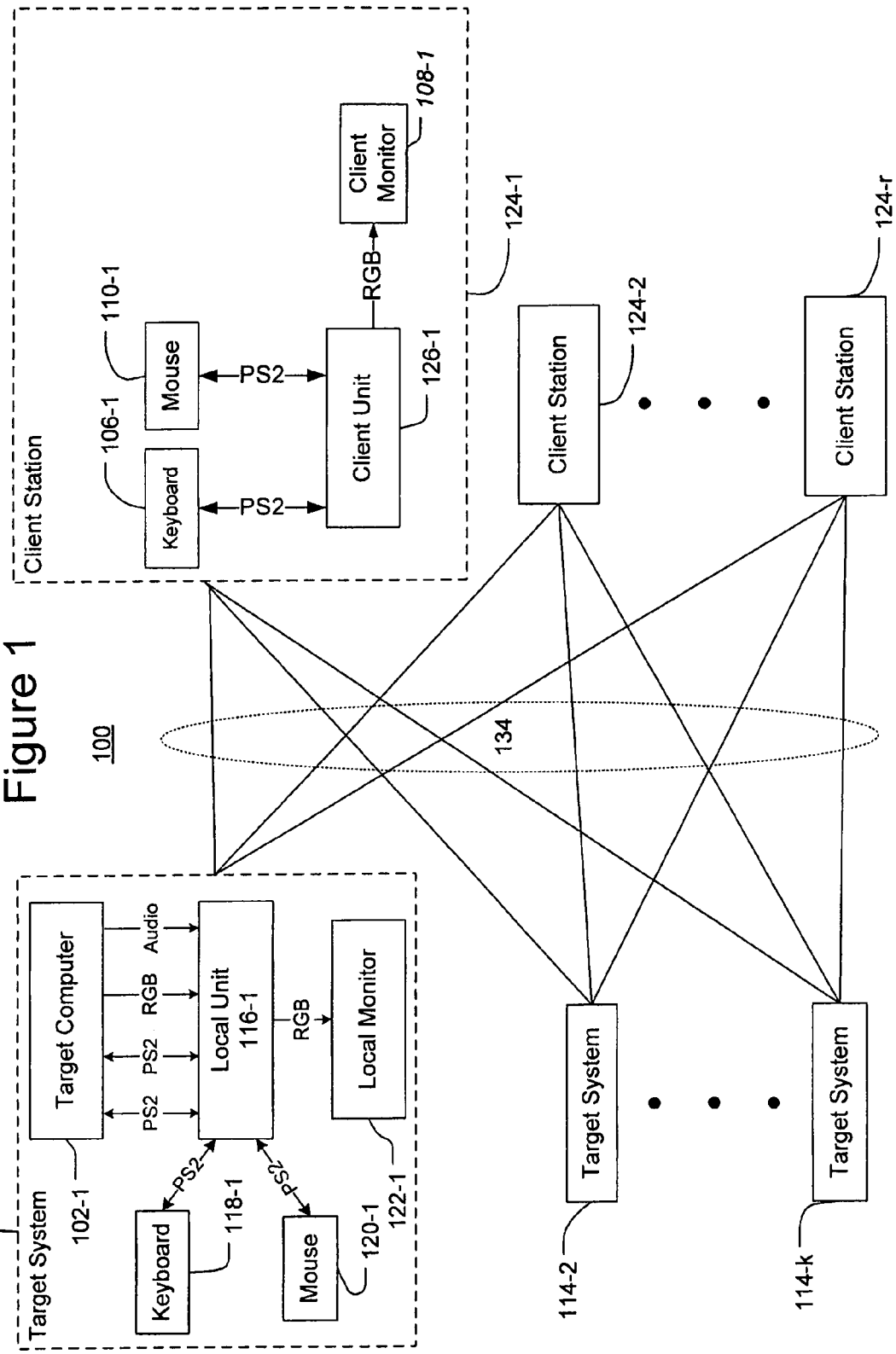
FIG. 1 illustrates an exemplary KVM computer system in accordance methods and systems consistent with the present invention.

Methods and systems in accordance with the present invention allow personal computer users to virtualize a local smart card so that they can remotely connect to a server and interact with the server as if the local smart card was physically connected to the server. They allow smart cards to be virtualized so that a remote user may attach their smart card reader to their local PC, insert their smart card into the local smart card reader, and then virtualize the smart card reader and the smart card so that it can be used with a computer anywhere in the world. In one implementation, they connect a remote smart card virtualization hardware device to the target computer through a physical connection, such as a USB connection, and the device interacts with the local user's computer and smart card reader over a network. As such, the target system is unaware that the actual smart card reader is not connected directly to the system through a physical connection, and the target system does not need special software to implement the remote smart card reader. The smart card target device connected to the target computer may be physically connected and disconnected, and the target computer interacts with the device as if it was the smart card reader, thereby avoiding the installation of special software on the target computer. These systems add smart cards to those devices for which a remote presence can be provided, such as keyboard, mouse, video and media.

Methods and systems in accordance with the present invention do not require special software on a remote PC. Through the use of an appliance or embedded hardware device at the remote location, the connection to the remote PC may be through a normal USB device. The device driver and middle layer software for the USB device is typically already installed with the base operating system running on the remote PC. No more software is needed on the remote PC than would be required if a user connected a smart card reader directly to the remote PC. For the target system, the implementation over the network appears the same as a local smart card reader. For example, Windows or Linux is already configured to accept a plug in smart card, and do not require any additional software on the host or target. The operating system operates as if a physical USB card reader is plugged into the target computer.

The lack of a need to have special software on the target computer provides the ability to be flexible, generic and used by a variety of clients and infrastructures with minimal infrastructure requirements. The target computer does not have to be a particular target or have particular software, and as a result, less overhead needs to be developed for implementation.

In the discussion that follows, the computer or system being controlled or accessed is generally referred to as the target computer or the target system. In some instances, the target computer is also referred to as the local computer, however, components local to the client computer may also be referred to as local. The system that is being used to access or control the target computer is generally referred to herein as the client system.

FIG. 1 depicts an exemplary KVM computer system in accordance methods and systems consistent with the present invention. A KVM system 100 is shown in FIG. 1, where one or more target systems 114-1 . . . 114-$k$ are controlled or accessed by one or more client stations 124-1, 124-2, . . . , 124-$r$ (generally 124). Each target system 114 includes a target computer 102 with associated and attached local unit 116. Each client station 124 generally includes a client unit 126, a keyboard 106, a video monitor 108, and a mouse (or similar point-and-click device) 110, although some client stations may only include a video display 108 and a client unit. Operation of a particular target computer 102-$i$ may be remotely viewed on the video monitor 108 of any of the client stations 124, and the keyboard 106 and mouse 110 of the client station 124 may be used to provide keyboard and mouse input to the target computer 102-$i$. As shown in FIG. 1, in a KVM system 100, a client station 124 is able to control or access more than one target computer. Note that the lines drawn between target systems and client stations in FIG. 1 represent potential (and not necessarily actual) wired or wireless (e.g., RF) links between those sides. Thus, each target computer 102 may be controlled or accessed by more than one client station 124, and each client station 124 may control more than one target computer 102. The client station, in one implementation, may be located within several hundred feet of the target system.

Furthermore, in certain contexts, the target system is considered to be a video transmitter or sending unit, and the client system is the video receiving unit or receiver, although both units transmit and receive. Generally, video travels from target system to client station, while keyboard and mouse data move from client station to target system.

As shown in FIG. 1 the local or target system 114 includes a target computer 102 and an associated local unit 116. The local system 114 may also include a keyboard 118, a mouse (or other point-and-click-type device) 120 and a local monitor 122, each connected to the local unit 116 directly. The client station 124 includes a client unit 126. The local or target computer 102 may be a computer, a server, a processor or other collection of processors or logic elements. Generally, a target computer may include any processor or collection of processors. By way of example, a target computer may be a processor or collection of processors or logic elements located (or embedded) in a server, a desktop computer (such as a PC, Apple Macintosh or the like), a kiosk, an ATM, a switch, a set-top box, an appliance (such as a television, DVR, DVD player and the like), a vehicle, an elevator, on a manufacturing or processing production line. A collection of target computers may, e.g., be a collection of servers in a rack or some other collection, they may be independent of each other or connected to each other in a network or by some other structure. The local and client monitors 122, 108, may be digital or analog.

The local unit 116 is a device or mechanism, e.g., a printed circuit board ("PCB"), that is installed locally to the target/local computer 102. This device may be close to, but external to the computer, or may be installed inside the computer's housing. Regardless of the positioning of the local unit 116, in one implementation, there is a direct electrical connection between the target computer 102 and the local unit 116.

Various components on the local/target system 114 communicate wirelessly or via a wired connection with components on the client station 124 via a wireless connection link 134. In one implementation, the wireless connection or link 134 follows the IEEE 802.11a standard protocol, although one skilled in the art will realize that other protocols and methods of communication are possible.

The local unit 116 receives local mouse and keyboard signals, e.g., as PS2 signals. These signals are provided by the local unit 116 to the target computer 102. The target computer 102 generates video output signals, e.g., RGB (Red, Green, Blue) signals, which are provided to the local unit 116 which, in turn, provides the signals to drive the local monitor 122. The target computer 102 may also generate audio output signals which are provided to the local unit 116. As noted, the target computer 102 need not have a keyboard, mouse or monitor, and may be controlled entirely by a client station 124.

Local unit 116 transmits image data for transmission to a client station (e.g., via client unit 126). Some or all of the data may be compressed before being transmitted. Additionally, local unit 116 may receive mouse and keyboard data (from a client station 124), which is then provided to the local/target computer 102. The target computer 102 may execute the data received and may display output on its local monitor 122.

The client station 124 receives video data from the local unit 116 of the target computer 102, via a wired or wireless connection (e.g., 802.11a wireless connection 134). The client unit 126 receives (possibly compressed) video data (not all of the data need be compressed) from the local unit 116. The client unit 126 decompresses (as necessary) the video data from the local unit 116 and provides it to the appropriate rendering device, e.g., to the client monitor 108, which displays the video data. Additionally, client mouse 110 and keyboard 106 may be used to generate appropriate signals (e.g., PS2 signals) that may be transmitted via client unit 126 to local unit 116 for execution on target computer 102.

Figure 2:
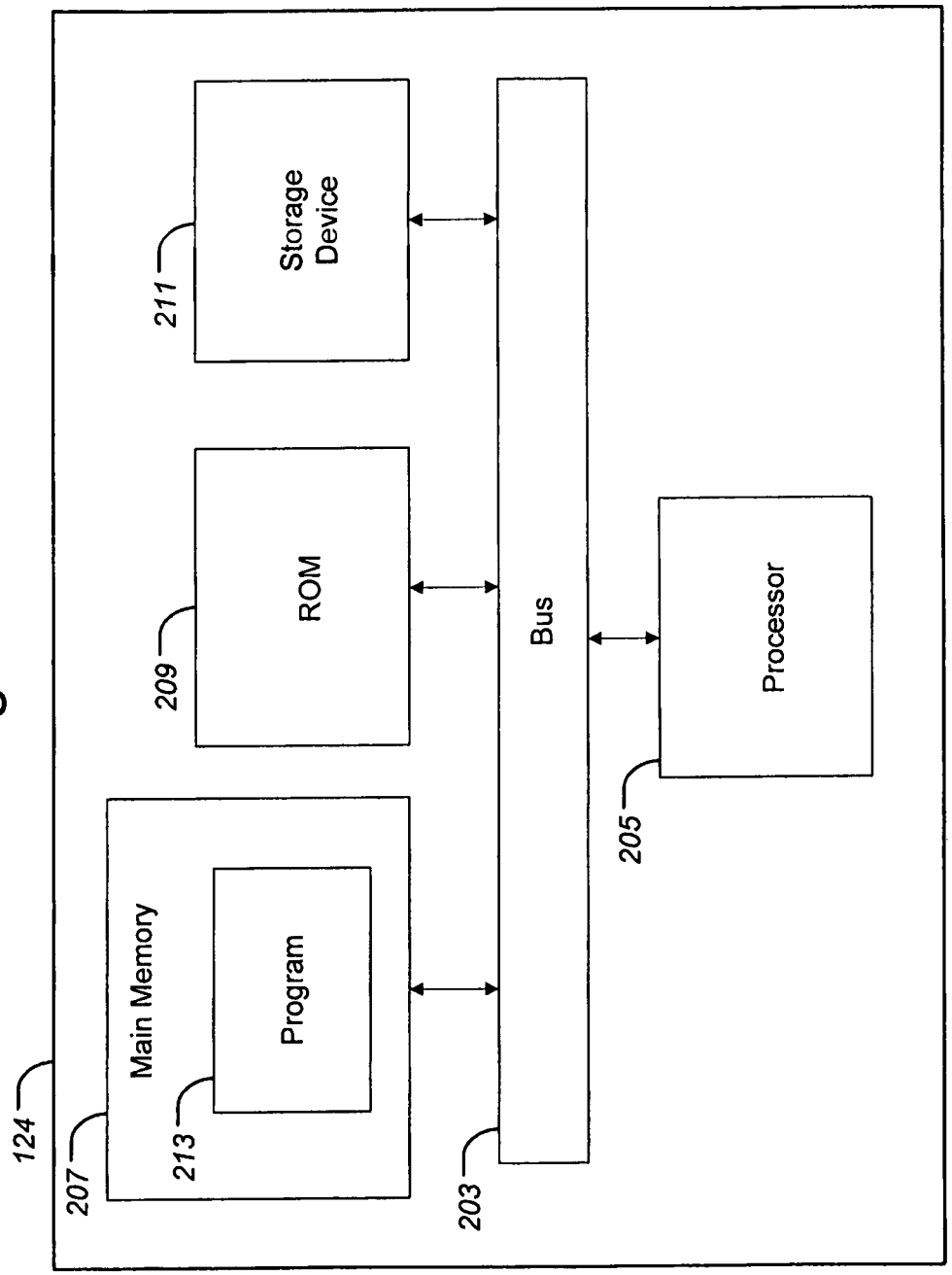
FIG. 2 illustrates an exemplary target computer system consistent with systems and methods consistent with the present invention.

FIG. 2 illustrates an exemplary client computer system consistent with systems and methods consistent with the present invention. Client computer 124 includes a bus 203 or other communication mechanism for communicating information, and a processor 205 coupled with bus 203 for processing the information. Client station 124 may also include similar components as client computer 124, including some or all of the components mentioned. Client computer 124 also includes a main memory 207, such as a random access memory (RAM) or other dynamic storage device, coupled to bus 203 for storing information and instructions to be executed by processor 205. In addition, main memory 207 may be used for storing temporary variables or other intermediate information during execution of instructions to be executed by processor 205. Main memory 207 includes a program 213 for implementing processing consistent with methods and systems in accordance with the present invention. Client computer 124 further includes a Read-Only Memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment, processor 205 executes one or more sequences of one or more instructions contained in main memory 207. Such instructions may be read into main memory 207 from another computer-readable medium, such as storage device 211. Execution of the sequences of instructions in main memory 207 causes processor 205 to perform processes described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Although described relative to main memory 207 and storage device 211, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Figure 3:
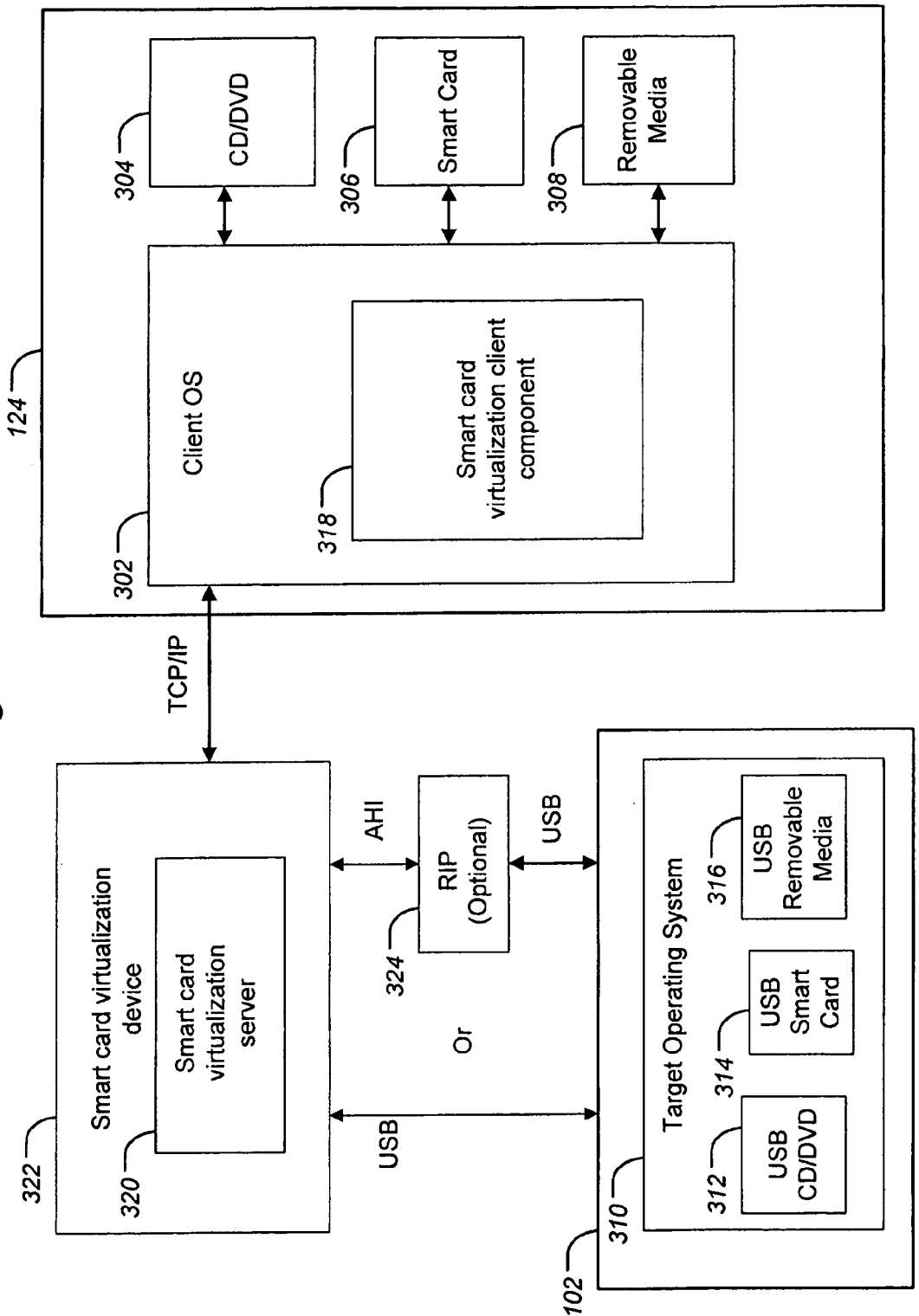
FIG. 3 depicts a smart card virtualization device in a computer network in accordance with methods and systems consistent with the present invention.

FIG. 3 depicts a smart card virtualization device 322 in a computer network in accordance with methods and systems consistent with the present invention. As shown on the Figure, the client station 124 includes a client operating system 302 which may connect to external devices, e.g., USB devices or other devices, such as a CD/DVD drive 304, removable media device 308, smart card reader 306, or any other suitable component. A client user plugs their smart card into this smart card reader 306 so that it can be authenticated and interact remotely with the target computer 102. These external components may be connected with a connection such as a serial connection, a USB connection, or any other suitable connection.

The target operating system 310 on the target computer 102 may be a normal operating system. Further, the target computer 102 may be connected to a USB CD/DVD 312, USB smart card reader 314, or USB removable media 316 or any other suitable components.

The client operating system 302 also includes a smart card virtualization client component 318, which may be software on the client computer 124 which interacts with the remote target smart card virtualization device 322, which in one implementation, is a hardware device. The client computer 124 may download the smart card virtualization client component 318. The smart card virtualization client component 318 communicates with the smart card virtualization server 320 remotely over a network using TCP/IP, and interacts with the local smart card reader 306.

In one implementation, the smart card virtualization device 322 is a hardware component that includes the smart card virtualization server 320 which may be firmware, software, or hardware for interacting remotely with the smart card virtualization client component 318 and locally with the target computer 102 and target computer operating system 310. This smart card virtualization device 322 may be plugged into the target computer 102 with a physical connection, such as a USB connection. In one implementation, the smart card virtualization server 320 communicates with the smart card virtualization client component 318 in the Avocent Virtual Media Protocol (AVMP) developed by Avocent, Inc.

This smart card virtualization device 322 receives information for smart card interaction, such as smart card commands, from the target operating system 310 and they are processed by the smart card virtualization server 320 on the smart card virtualization device 322. The smart card virtualization server 320 processes, translates and transmits the smart card commands in the AVMP protocol over TCP/IP to the smart card virtualization client component 318. The smart card virtualization device 322 includes a processor that runs smart card virtualization server 320 software, and that processor may also have a USB device controller (not shown) built in. It uses a network connection to connect to the client computer 124, and a USB device connection to connect to the target computer 102. The smart card virtualization device 322 translates smart card commands and responses from the network format to the USB format and vice versa.

For example, the smart card virtualization server 320 receives the smart card command from the target computer 102, translates the command and sends it over TCP/IP to the smart card virtualization client component 318. The response to the smart card command traverses back from the smart card virtualization client component 318 to the AMVP server on the smart card virtualization device 322, and through the physical USB connection to the target computer 102. In one implementation, the smart card commands may conform to the ISO specification for smart cards. One example of a smart card command is a command to authenticate the user and smart card.

On the client system 124, the smart card virtualization client component 318 uses services provided by the client operating system 302 to send the smart card command out to the physical smart card reader 306 connected to the client computer.

In one implementation, a RIP (Rack Interface Pod) 324 may be included between the target computer 102 and the smart card virtualization device 322. This RIP 324 is optional and may apply to appliance products and may have a USB device controller. In some appliances, the USB controller is separate from main processor, as opposed to being bundled with the processor. The optional RIP connection to the smart card virtualization device 322 client may be over a different protocol used by appliances internally, such as Avocent High-Speed Interface (AHI) protocol from Avocent, Inc.

Figure 4:
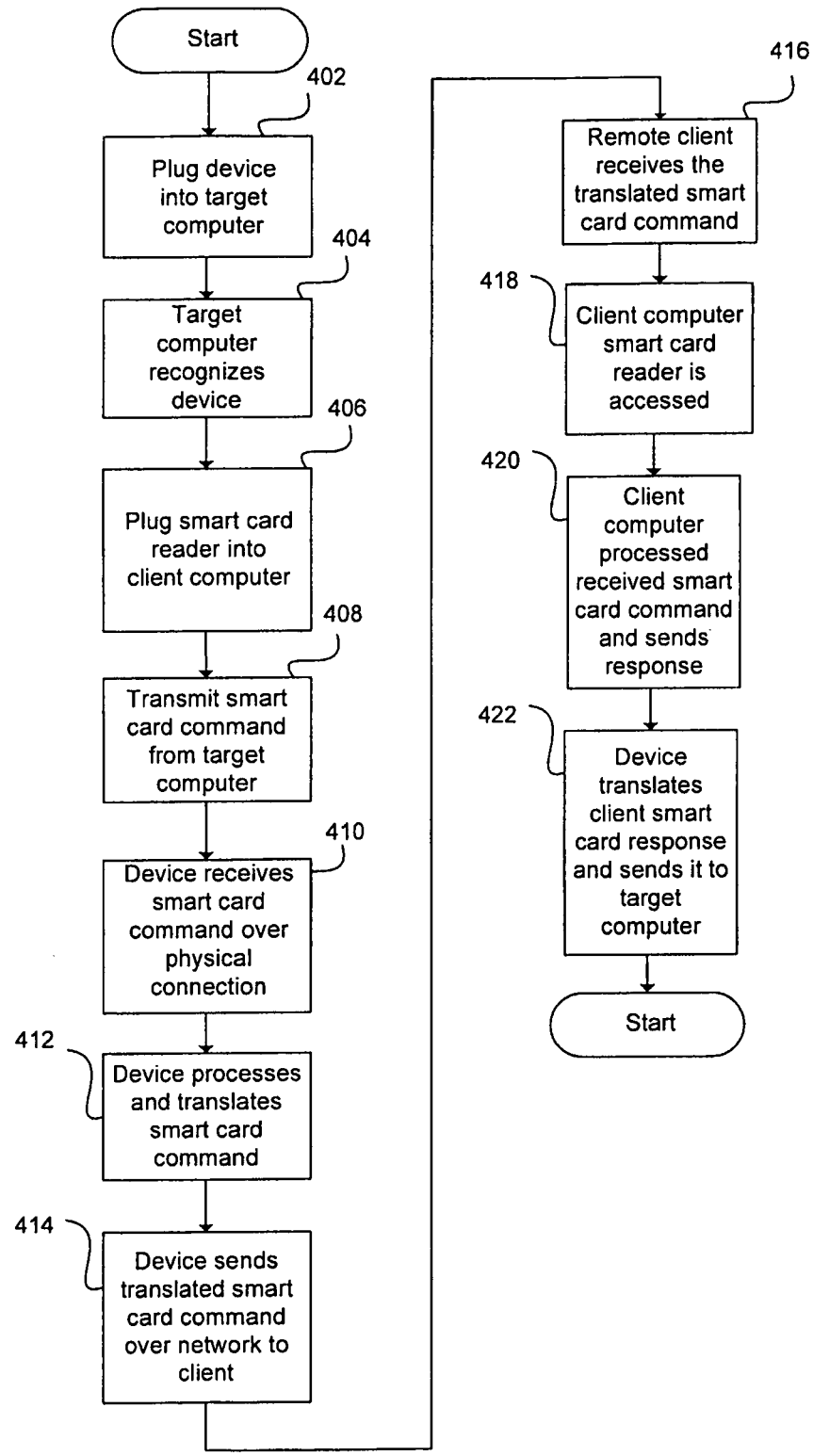
FIG. 4 illustrates a flowchart of exemplary steps of a method for smart card virtualization in a computer network in accordance with methods and systems consistent with the present invention

FIG. 4 illustrates a flowchart of exemplary steps of a method for smart card virtualization in a computer network in accordance with methods and systems consistent with the present invention. First, a smart card virtualization device 322 is plugged into a target computer 102 via a physical connection such as USB (step 402). The target operating system 310 recognizes the USB-connected smart card virtualization device 322 as a local USB smart card reader and operates accordingly (step 404). Additionally, a smart card reader 306 is plugged into the client computer 124 (step 406).

The target operating system 310 transmits a smart card command over the USB connection to the smart card virtualization device 322 as it would to a physically connected local smart card reader 314 (step 408). Next, the smart card virtualization device 322 receives the smart card command and passes it to smart card virtualization server 320 (step 410). Furthermore, the smart card virtualization server 320 on the smart card virtualization device 322 receives the USB smart card command and translates it to a protocol used by the smart card virtualization server 320 and the smart card virtualization client component 318, such as the AVMP protocol (step 412).

The smart card virtualization server 320 transmits the translated smart card command over TCPIP to the remote client computer 124 (step 414). The remote client computer's operating system 302 receives the translated smart card command and passes it to the smart card virtualization client component 318 (step 416).

The smart card reader 306 attached to the client computer 124 reads the smart card and passes the smart card information to the smart card virtualization client component 318 (step 418). Further, the smart card virtualization client component 318 processes the received smart card command request and sends the smart card command response via TCPIP to the smart card virtualization server 320 on the smart card virtualization device 322 (step 420). Thus, the smart card virtualization server 320 translates the smart card command response to the USB format to be outputted to the target operating system 310 on the target computer 102 (step 422). This process may work in reverse, with the client computer 124 and smart card reader 306 initiating smart card interactions.

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A data processing system for virtualization of a smart card reader, comprising:
   a target computer configured to send and receive smart card data to a locally connected smart card virtualization device;
   a client computer locally connected to a smart card reader;
   the smart card virtualization device separate from and locally connected to the target computer, configured to:
      receive smart card commands from the locally connected target computer;
      send the received smart card commands to the client computer over a network;
      receive smart card command response data from the client smart card reader over the network;
      process the received smart card command response data; and
      send the processed smart card response data to the locally connected target computer through a physical USB connection plugged into the target computer.

2. The data processing system of claim 1, wherein the target computer interacts with the smart card virtualization device in the same way it interacts with a locally connected smart card reader.

3. The data processing system of claim 1, wherein all software for remote smart card interaction is on the smart card virtualization device and the client computer.

4. The data processing system of claim 1, wherein the client computer is a KVM client that controls the target computer.

5. The data processing system of claim 1, wherein the client computer comprises a program configured to interact with the locally connected smart card reader and the smart card virtualization device.

6. The data processing system of claim 1, wherein communications over the network are TC/PIP communications.

7. The data processing system of claim 1, wherein a smart card is plugged into the smart card reader.

8. A smart card virtualization device separate from a target computer, comprising:
   a network interface configured to interact with a client computer to send smart card commands and receive smart card command responses over a network;
   a USB input/output interface configured to physically plug into the target computer, and to receive smart card commands from the target computer and send smart card command response; and
   a processor configured to:
      translate the received smart card commands from the physical input/output interface for output to the network interface; and
      translate the received smart card command response from the network interface for output to the physical input/output interface.

9. The smart card virtualization device of claim 8, wherein the target computer interacts with the smart card virtualization device in the same way interacts with a locally connected smart card reader.

10. The smart card virtualization device of claim 8, wherein the client computer is a KVM client that controls the target computer.

11. The smart card virtualization device of claim 8, wherein the client computer comprises a program configured to interact with the locally connected smart card reader and the smart card virtualization device.

12. The smart card virtualization device of claim 8, wherein the network interface communicates using TCP/IP.

13. A method in a data processing system for virtualization of a smart card reader, comprising:
   receiving smart card commands from a locally connected target computer;
   sending the received smart card commands to a client computer connected to a smart card reader over a network;
   receiving smart card command response data from the client computer over the network;
   processing the received smart card command response data; and
   sending the processed smart card response data to the locally connected target computer through a physical USB connection plugged into the target computer.

14. The method of claim 13, further comprising interacting with the target computer in the same way as a locally connected smart card reader.

15. The method of claim 13, wherein all software for remote smart card interaction is on the smart card virtualization device and the client computer.

16. The method of claim 13, wherein the client computer is a KVM client that controls the target computer.

17. The method of claim 13, wherein the client computer comprises a program configured to interact with the locally connected smart card reader and the smart card virtualization device.

* * * * *